Figures 1, 2:
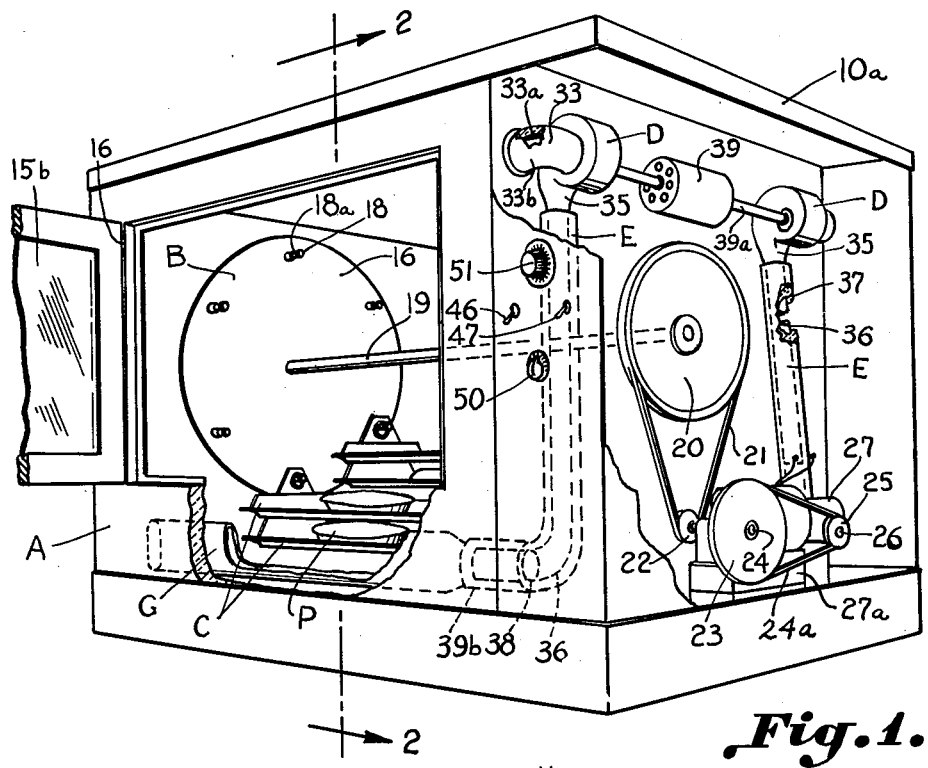

Jan. 22, 1963 C. M. VAUGHAN 3,074,360
OVEN
Filed March 18, 1960 2 Sheets-Sheet 1

INVENTOR.
CHARLES M. VAUGHAN
BY
ATTORNEY

Jan. 22, 1963 C. M. VAUGHAN 3,074,360
OVEN
Filed March 18, 1960 2 Sheets-Sheet 2
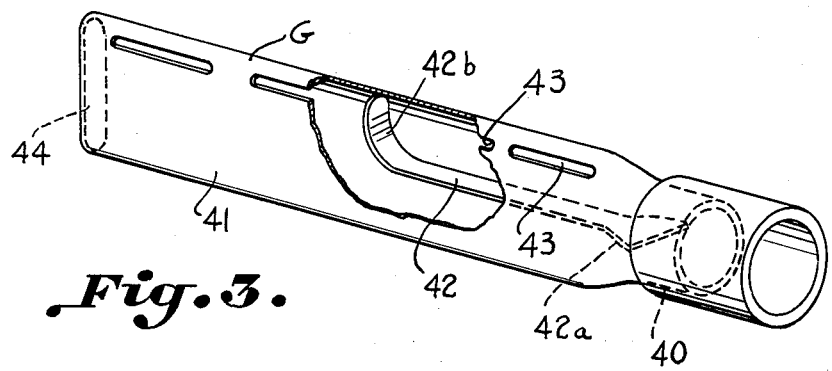
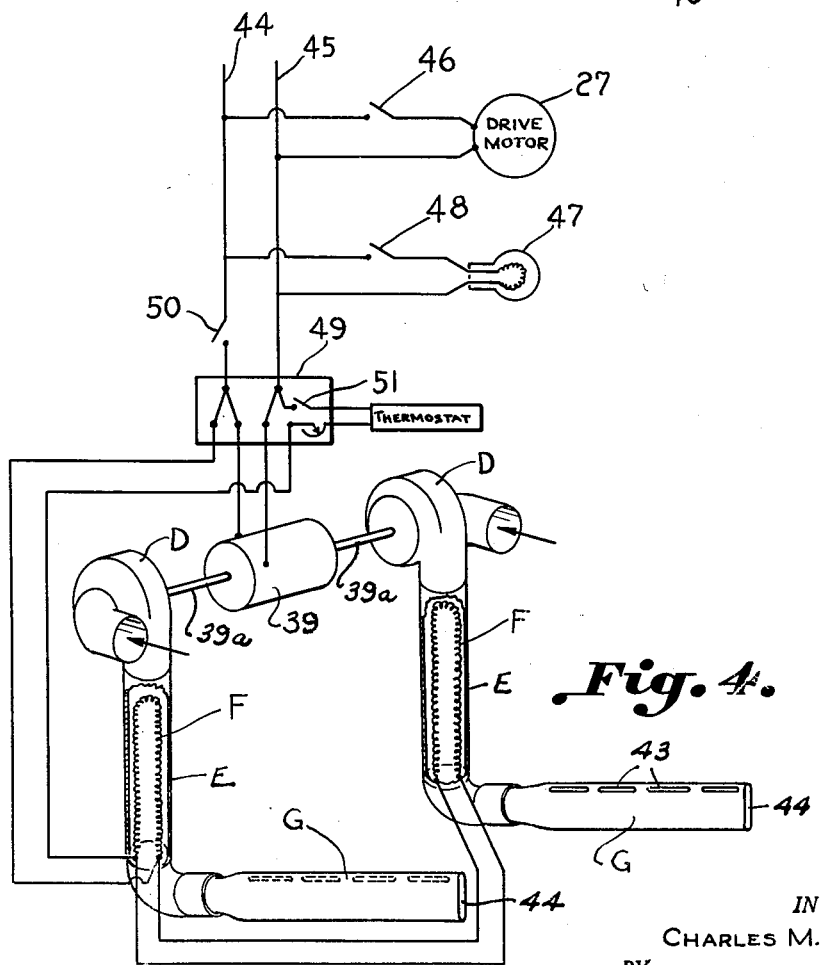
INVENTOR.
CHARLES M. VAUGHAN
BY
ATTORNEY United States Patent Office 3,074,360
Patented Jan. 22, 1963

3,074,360
OVEN
Charles M. Vaughan, 28 Frontus St., Greenville, S.C.
Filed Mar. 18, 1960, Ser. No. 16,061
4 Claims. (Cl. 107—59)

This invention relates to cooking devices and more particularly to an improved oven especially suited to the baking of frozen pies and the like.

In the cooking of pies, for example, due to uneven heating in the oven and the consequent tendency of one portion of the pies to cook faster than other portions, it is normally necessary to periodically turn the pies in the oven. If a number of pies are being baked at one time it is necessary to be very careful to avoid overcooking certain of the pies while undercooking others. Grease and juices from the pies often boil over and drop upon the heating elements causing smoke and sometimes fire. The presence of heating elements below the eatables being cooked and the gummy deposits caused by grease and juices falling thereon make the usual oven exceedingly difficult to keep clean. It is normally necessary to maintain heating elements below the eatables being cooked in order to carry out a baking process. If several eatables were stacked, therefore, on shelves and the like one above the other, there is a tendency to insulate certain of the eatables from the heat below so that those above will tend to be undercooked while those below will tend to be overcooked.

Accordingly, it is an object of this invention to provide an oven in which the heating elements are removed from the oven and yet provide improved means to sufficiently elevate the temperature of the oven so as to effectively cook by convection.

An important object of the invention is to maintain a uniform heat throughout the oven.

Another important object of the invention is the provision of an oven in which the heating means are located externally of the oven and in which a reel type support is provided for moving eatables being cooked so as to distribute heat uniformly throughout the oven and subject each of the eatables to an even heat.

Another object of the invention is to provide means for circulating the air and gases within an oven and subjecting same to external heating means while maintaining the moisture carried in the air and gases so as to not dry out the eatables being baked.

Another object of the invention is the provision of an oven which will obviate the necessity of turning or repositioning the eatables being cooked within the oven.

Still another object of the invention is to increase the oven capacity by eliminating the tendency of eatables to insulate other eatables positioned thereabove from the source of heat within the oven so that a number of eatables may be stacked within the oven and cooked simultaneously under uniform heat.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGURE 1 is a perspective view, with parts broken away, illustrating a preferred embodiment of the invention, FIGURE 2 is a transverse sectional view taken on the line 2—2 in FIGURE 1, FIGURE 3 is an enlarged perspective view, with parts broken away, showing the heat duct illustrated in the lower left-hand portion of FIGURE 1, and FIGURE 4 is a schematic view showing the various electrical elements used with the preferred embodiment of the invention illustrated.

Referring more particularly to the drawings, an insulated substantially enclosed oven is indicated at A. A reel type support B for eatables is positioned for rotation within the oven and carries a number of double trays C. Blower means D are positioned externally of the insulated oven walls and communicate with the interior of the oven A to receive air and gases therefrom. Insulated passageways E having heating means F disposed therein communicate with the blowers D of and with the interior of the oven. An elongated chamber G is positioned within the oven and extends partially across the oven adjacent one of the sides thereof and communicates with the passageway so as to distribute the heated air and gases substantially uniformly throughout the oven under the static air pressure which is maintained within the chamber G. The revolving reel arrangement B serves to promote the distribution of heat within the oven and at the same time insures that the eatables carried thereby are subjected to a uniform heat. The chamber G is illustrated as being positioned so that heated air therefrom is discharged into the oven above the eatables when the trays are in their lowermost position.

The oven A is illustrated as being rectangular in shape and the walls thereof are preferably of sheet metal construction with Fiberglas insulation. The sides and top of the oven are shown to include an outer sheet metal portion 10 and inner sheet metal portion 11 with Fiberglas insulation 12 therebetween. The oven A is illustrated as having a sheet metal bottom 13 and an air space 14. The doors 15 of the oven are hinged as at 16 and include suitable glass 15a so that the cooking operation being carried out within the oven may be observed from the outside without opening the doors 15.

The assembly B for supporting eatables is shown to be of the reel type which includes a pair of spaced transversely disposed supporting members in the form of discs 16 and 17 each of which carries inwardly facing pin supports 18. The pin supports 18 have a reduced central portion 18a. The disc supports 16 and 17 are fixed upon a shaft 19 which is mounted for rotation in any suitable manner but preferably within bearings (not shown) carried by the oven walls A. The shaft 19 is shown extending outwardly of the oven in the right hand side of FIGURE 1 and carries a pulley 20 which is fixed adjacent the end thereof. The pulley 20 is rotated by the belt 21 which is driven by the pulley 22. The pulley 22 is driven by a speed reduction pulley 23 through the shaft 24. The speed reduction pulley 23 is driven by the pulley 25 through the belt 24a from the power takeoff shaft 26 of the motor 27 which is mounted on a base 27a. A cover 10a is provided as a housing for this driving mechanism as well as the heating mechanism. The cover or housing 10a, enclosing the driving mechanism, is shown in FIGURE 1. The housing 10a is formed exteriorly of the oven A by extending the front and rear walls as well as the top 10 and bottom 13 and providing a side wall. The extension of the front wall and the side wall are shown broken away in FIGURE 1.

The eatable supports in the form of double trays C have end frame members 28 which are spaced and support a pair of superposed trays 29 therebetween. The trays 29 have upturned edges 30 integral therewith. The top tray is suitably secured to the end frame members 28 as by rivets 31 while the lower trays are integral with the end frame members 28. A bushing 32 is carried adjacent each of the top end frame members 28 and is adapted to be pivoted upon the central portion 18a of the pins 18. The trays are replaceable and may be positioned upon the pins by pushing one of the end frame members 28 toward the disc D and then placing the other frame member 28 upon the opposite pin 18 so that both bushings 32 are carried upon opposite reduced portions 18a. By providing these double trays C, a number of pies P and the like may be carried in superposed relation thus increasing the capacity of the oven since the lower of the superposed pies will not have an insulating effect upon the pies above.

The blower means D are shown positioned externally of and adjacent the oven A in the cover or housing 10a. While two blowers D are illustrated, it is possible that one blower of sufficient capacity would suffice. The blowers on the intake sides communicate with the oven A through insulated ducts 33 which include ducts 33a and insulation 33b. The tubes 33a have a sliding fit within apertures 34 within the oven walls. On the outlet side of the blowers D the blower housings 35 communicate with insulated passageways E. The insulated passageways E include tubes 36 which have a pressed sliding fit with the housings 35 and coverings of Fiberglas insulation 37. The blowers D are both operated by a single motor 39 through a shaft 39a.

The passageways E communicate with the chamber G through the apertures 38 within the oven wall A. The tube 36 has a sliding fit with a collar 39b which also receives an elongated flat portion of the chamber G as at 40. It will be noted that the flat portion 41 of each of the chambers G is vertically disposed and that a baffle 42 which has a pressed fit in the flattened portion to distribute air under substantially uniform static pressure within the chamber so that the elongated orifices 43 will be supplied with a substantially equal quantity of air for distribution into the oven. By reference to FIGURE 2 it will be noted that the orifices 43 are illustrated as being positioned to direct the heated air over the top of the uppermost pie when such pie is in its lowest position in its rotation about the shaft 19. The chamber G has a closed end 44 and the orifices 43 are of such size and spacing that substantially uniform static air pressure is built up within the chamber G for distribution within the oven A.

Such static pressure results when air is delivered such as by being blown by fan D into an enlarged housing. A relatively high volume of air is emitted therefrom at a relatively low velocity. As air is emitted along the housing, the pressure drops toward the remote end of the housing unless the volume of air contained in a given length of housing is progressively reduced. The purpose of the baffles is to reduce such volume of air so as to maintain a uniform static pressure throughout the length of the housing. This results in a uniform flow of heated air into the oven across the eatables being cooked therein.

A circuit diagram for the various electrical elements is illustrated in FIGURE 4 in which a suitable source of electrical energy (not shown) is connected across the lines 44 and 45. The drive motor 27 is connected across the line and is provided with a switch 46 for energizing and de-energizing the motor. A light 47 is also connected across the line and is also provided with an on and off switch 48. The blower motor 39 is connected across the line through a thermostat 49 so as to be operable when the switch 50 is closed to complete the circuit. It will be noted that the blower motor 39 is so connected as to operate when the switch 50 is closed while the electrical heating elements F which are illustrated in the form of resistance coils may be taken out of the line by virtue of the thermostat opening the switch 51 which forms a part of the thermostat. Thus the blower constantly circulates air within the oven taking same from the top thereof and through the insulated tube 33 to the passageway E and into the chamber G for distribution in the oven during the baking operation while the heating elements F are energized responsive to the setting of the thermostat 49 when it is necessary to maintain the desired temperature.

While a preferred embodiment of the invention has been described using specific terms, such description is for illustrative purposes only, and it is to be understood that changes and variations may be made without departing from the spirit or scope of the following claims.

What is claimed is:

1. In an oven for baking pies and the like, the combination including, an insulated substantially closed casing, a reel assembly mounted for rotation within the casing having a horizontally disposed central shaft, a tray supporting member carried by the shaft adjacent each end thereof, a plurality of trays positioned between the tray supporting members so that the trays remain substantially level during rotation, a blower having an air intake side and an air outlet side located exteriorly of and adjacent the oven, a passageway communicating with the upper portion of the oven and with the air intake side of the blower, an insulated passageway communicating with the air outlet side of the blower, means positioned within the insulated passageway heating the air discharged by the blower therein, means diffusing air evenly in relatively high volume and at relatively low velocity into the oven above the trays when they are in their lowermost position, and a passageway communicating with the means diffusing air and with the insulated passageway, whereby a substantially even temperature obtains throughout the oven.

2. The structure set forth in claim 1, in which said means diffusing air includes, an elongated chamber extending substantially across the oven having apertures therein, and means maintaining a substantially uniform static pressure along the entire length of said chamber.

3. The structure set forth in claim 2, in which said chamber is flattened and is vertically disposed, and in which said means maintaining a substantially uniform static pressure includes a baffle separating said chamber into a plurality of sections all communicating with said insulated passageway.

4. In an oven for baking eatables, the combination including, an insulated substantially closed casing, a reel assembly mounted for rotation within the casing having a horizontally disposed central shaft, a transversely disposed supporting member carried by the shaft adjacent each end thereof, a plurality of eatable supports positioned between the transversely disposed supporting members for positioning the eatable supports during rotation of the assembly, a blower having an air intake side and an air outlet side located exteriorly of and adjacent the oven, a passageway communicating with the upper portion of the oven and with the air intake side of the blower, an insulated passageway communicating with the air outlet side of the blower, means positioned within the insulated passageway heating the air discharged by the blower therein, means diffusing air substantially evenly in relatively high volume and at relatively low velocity into the oven adjacent the eatable supports when they are in their lowermost position, and a passageway communicating with the means diffusing air and with the insulated passageway, whereby a substantially even temperature obtains throughout the oven.

References Cited in the file of this patent

UNITED STATES PATENTS

| 1,403,796 | McDonald | Jan. 17, 1922 |
| 2,106,052 | Faulds | Jan. 18, 1938 |
| 2,286,049 | Baker | June 9, 1942 |
| 2,467,505 | Sidell | Apr. 19, 1949 |
| 2,530,177 | Pursell | Nov. 14, 1950 |
| 2,575,291 | Owen | Nov. 13, 1951 |
| 2,814,243 | Berger et al. | Nov. 26, 1957 |

FOREIGN PATENTS

| 965,635 | France | Feb. 22, 1950 |